United States Patent
Brosilow et al.

[15] 3,653,974
[45] Apr. 4, 1972

[54] BATTERY COVER

[72] Inventors: Jerry Brosilow, Chicago; Jack Levitt, Des Plaines, both of Ill.

[73] Assignee: World Battery Corporation

[22] Filed: Apr. 15, 1970

[21] Appl. No.: 28,876

[52] U.S. Cl..............................136/170, 136/177, 136/181
[51] Int. Cl.........................................H01m 1/02, H01m 1/06
[58] Field of Search................................136/170, 177, 181

[56] References Cited

UNITED STATES PATENTS

| | | | |
|---|---|---|---|
| 3,093,515 | 6/1963 | Rector | 136/170 |
| 3,284,244 | 11/1966 | Lucas | 136/170 |
| 2,022,090 | 11/1935 | Roberts | 136/170 |

FOREIGN PATENTS OR APPLICATIONS 644,420  10/1950  Great Britain.........................136/177

*Primary Examiner*—Donald L. Walton
*Attorney*—Hofgren, Wegner, Allen, Stellman & McCord

[57] ABSTRACT

A cover structure for use with a storage battery. The cover includes a plurality of depending vent plugs adapted to have fitted engagement with the top wall of the battery in the fill openings thereof and includes depending wall means for protecting the space about the vent openings and means for protectively overlying the battery terminals. Further, where the battery is provided with a data indicating means on the top wall thereof, the cover structure may include a depending wall means for protecting the space above the data indicating means. The cover includes means for facilitated manual installation and removal thereof.

9 Claims, 6 Drawing Figures

Patented April 4, 1972
3,653,974
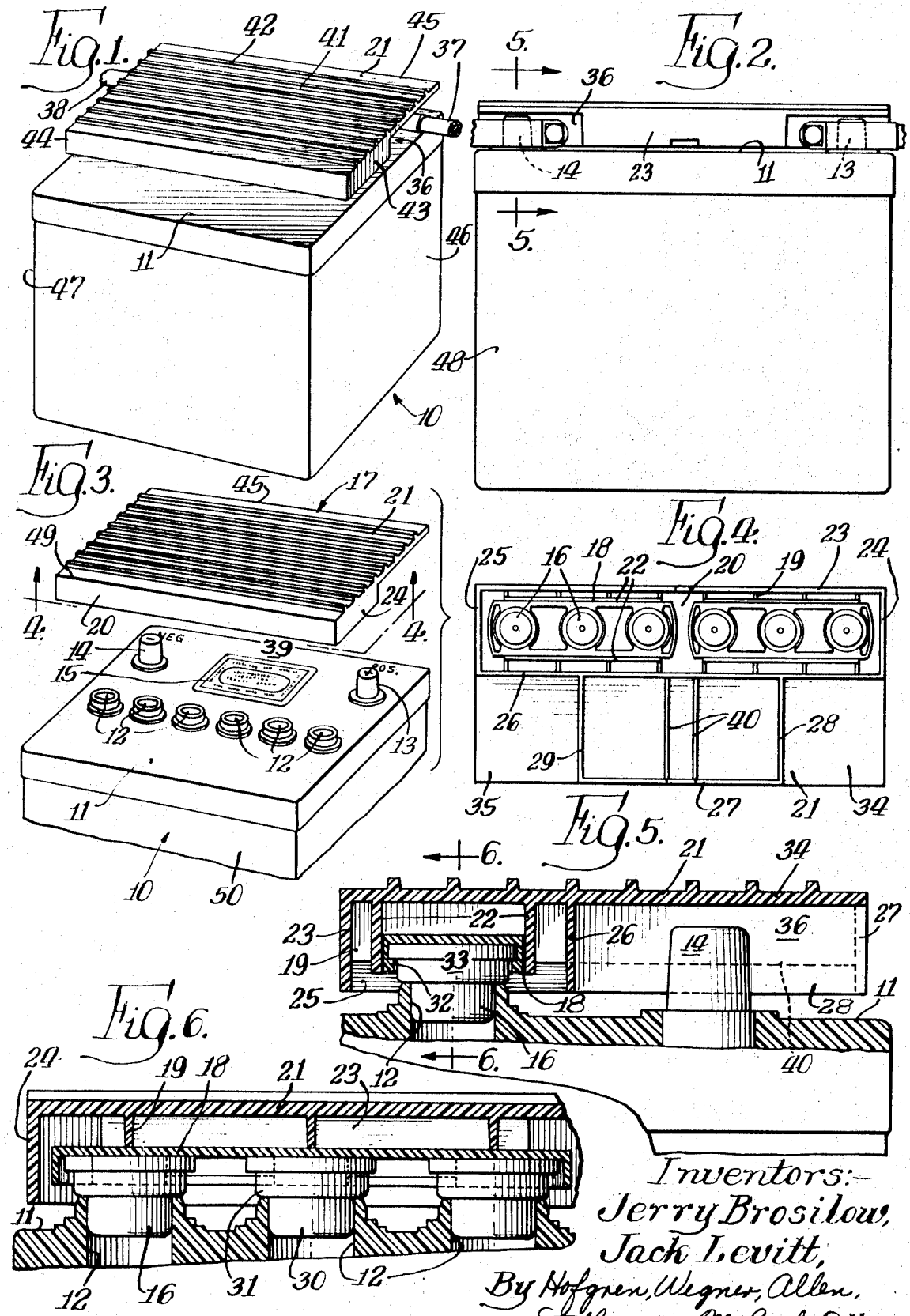

3,653,974

BATTERY COVER

BACKGROUND OF THE INVENTION

1. Field of the Invention

This invention relates to batteries, and in particular to storage batteries.

2. Description of the Prior Art

In the conventional storage battery, the top wall thereof is provided with a plurality of fill openings through which distilled water and the like may be introduced into the battery for forming the electrolyte solution therein. Further, a pair of terminals may be provided projecting upwardly from the top wall spaced from the fill openings.

A number of devices have been developed for selectively closing the fill openings. The conventional fill opening-closing means comprises a threaded cap adapted to be secured to a threaded wall portion defining the opening. Recently, multiple vent plug assemblies have been developed for removably closing a plurality of the fill openings. The multiple vent plug assemblies include a carrier member whereby each of the pluralities of vent plugs is suitably positioned for alignment with the fill openings whereby the plurality of plugs may be installed and removed as a unit.

It further has been conventional in the use of such storage batteries to provide protective covers for the battery terminals and cable attachments thereto. Illustratively, plastic or rubber caps have been mounted on the cables to overlie the connector end. When connected to the terminals, the connectors are thusly protected against dirt and foreign matter from falling onto the terminals and connectors.

SUMMARY OF THE INVENTION

The present invention comprehends an improved storage battery cover structure including vent plug means for closing the fill openings of the battery and means for covering the battery terminals and cable connections thereto. The cover structure is formed as an integral one-piece unit and includes means for facilitated manual installation and removal of the unit relative to the battery.

The cover structure further includes means for preventing deposition of dirt and foreign matter on the vent plug means and the battery top adjacent thereto.

Still further, the battery top may be provided with a data indicating means such as a card secured to the top wall and bearing suitable indicia pertinent to the particular battery, such as the date of installation, type of battery, etc. The cover structure includes means for protectively covering the space above the date indicating means thereby to maintain the indicating means relatively clean for facilitated use in determining the data carried thereby.

The cover structure may include a flat top panel and depending wall means defining the means for protecting the spaces about the fill openings and about the data indicating means. The wall means may serve further as reinforcing means, permitting the panel to be relatively thin while yet providing suitable rigidity thereto. The top of the panel may be further provided with cross ribs for further improved reinforcement thereof.

The cover structure may be formed of a suitable molded plastic and, thus, is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a storage battery having a cover structure embodying the invention;

FIG. 2 is a rear elevation thereof;

FIG. 3 is a fragmentary perspective view thereof with the cover structure removed from the battery top;

FIG. 4 is a bottom plan view of the cover structure;

FIG. 5 is a fragmentary enlarged transverse section taken substantially along the line 5—5 of FIG. 2; and FIG. 6 is a vertical section taken substantially along the line 6—6 of FIG. 5.

DESCRIPTION OF THE PREFERRED EMBODIMENT

In the exemplary embodiment of the invention as disclosed in the drawing, a storage battery generally designated 10 is shown to comprise a conventional storage battery having a top wall 11 provided with a plurality of fill openings 12 through which suitable fluid such as distilled water may be introduced to form the acid electrolyte of the battery. Projecting upwardly from the battery top is a pair of terminals 13 and 14 of conventional construction. A data indicating card 15 may be provided on the battery top and may be suitably arranged to identify data relating to the battery such as date of installation, the serial number of the battery, the type of battery, information as to the guarantee or warranty of the battery, etc.

As seen in FIG. 3, the battery fill openings 12 may be arranged in a line extending across the width of the battery. The vent openings are adapted to be closed by suitable vent plugs, such as vent plugs 16 as shown in FIGS. 4 and 6. In the illustrated embodiment, the vent plugs 16 are carried on a cover structure generally designated 17 for facilitated installation and removal relative to the fill openings. As best seen in FIGS. 4, 5, and 6, the vent plugs may be retained on a suitable carrier 18 secured by suitable mounting ribs 19 whereby the vent plugs depend from the underside 20 of the cover structure to fit the vent openings 12. The mounting ribs are formed integrally on a generally rectangular panel 21 and may include a pair of transverse ribs 22 between which the carrier 18 is secured as by adhesive bonding. Vent plugs 16 and carrier 18 are positioned on the panel 21 so as to be aligned with the vent openings 12 for substantially concurrent installation and removal of all six of the indicated vent plugs. The arrangement of the fill openings in the rectilinear configuration of FIG. 3 is exemplary only, it being understood that the invention comprehends the provision of any suitable arrangement of fill openings in the battery and corresponding disposition of the vent plugs on the cover structure 17.

Cover structure panel 21 is further provided with a front depending wall 23, side depending walls 24 and 25, middle depending wall 26, rear depending wall 27, and side connecting walls 28 and 29. Walls 23–29 may have substantially similar height to extend to superjacent the top wall 11 of the battery, as best seen in FIGS. 5 and 6, when the vent plugs 16 are installed in the fill openings 12. As shown in FIGS. 5 and 6, vent plugs 16 may include a plug portion 30 received in the vent opening and an enlarged upper portion 31 extending across the top of the vent openings. The vent plugs may be retained in carrier 18 by suitable coacting fingers 32, as best seen in FIG. 5. Thus, walls 23, 24, 25, and 26 define a depending wall means extending about the space 33 overlying the vent openings 12 effectively protecting the vent openings and the top wall of the battery adjacent the vent openings from the deposition of dirt and other foreign material.

The rear corner portions 34 and 35 of panel 21 overlie the battery terminals 13 and 14 respectively, as best seen in FIG. 5, to protect the space 36 adjacent the terminals from falling dirt and similar foreign material thereby maintaining the cable connection to the terminals clean. As best seen in FIGS. 1, 2, and 5, the spaces 36 are open from laterally subjacent panel portions 34 and 35, permitting the battery cables 37 and 38 to extend freely into space 36 for connection to the terminals 13 and 14.

Panel corner portions 34 and 35 further define improved grasping means for faciliated installation and removal of the cover structure 13 relative to the battery. As best seen in FIG. 5, panel corner portions 34 and 35 are spaced substantially above the top wall 11 of the battery permitting the user's fingers to be readily inserted therebetween for facilitated grasping of the corner portions during installation and removal of the cover structure.

The mid-portion of wall 26 cooperates with walls 27, 28 and 29 to define a depending wall means enclosing the space 39 overlying the data indicating means 15 and protecting this space from falling dirt and similar foreign material, thereby maintaining the legibility of the data indicating means for facilitated reading by the user. A pair of reinforcing walls 40 may be provided extending between walls 26 and 27 at the center of panel 21 as desired. Walls 40 may have a height somewhat less than walls 26–29, as best seen in FIG. 5.

The top surface 41 of panel 21 may be provided with a plurality of upstanding transverse ribs 42 extending the full width of the panel to reinforce the panel against deflection. Thus, the depending walls and upstanding ribs cooperate to reinforce the panel 21 permitting the panel to be formed of relatively thin, lightweight molded plastic. Each of battery top wall 11 and panel 21 may have a rectangular configuration, as best seen in FIG. 3. The width of panel 21 may be similar to the width of battery top wall 11 and the side edges 43 and 44 and rear edge 45 may be vertically aligned with the sides 46 and 47 and rear 48 of the battery, respectively. The front edge 49 of panel 21 may be disposed substantially rearwardly of the front 50 of the battery and in the illustrated embodiment, is disposed only slightly forwardly of the line of fill openings 12.

In use, the connections to the terminals 13 and 14 may be readily made with the cover structure 17 removed from the battery as shown in FIG. 3. If desired, cover structure 17 may be installed reversely from the position of FIG. 1 to close the vent openings 12 while providing full accessibility to the terminals 13 and 14 at this time. Upon completion of the connection of the cables to the terminals, the cover structure may be installed on the battery as shown in FIGS. 1 and 3, by a movement of the cover structure downwardly thereto until the vent plugs 16 of the cover structure are snugly received within the corresponding series of fill openings 12. The snug fit of the vent plugs maintains the cover structure in place over the battery top and no further securing means is necessary. Cover structure 17 maintains the space overlying the battery top wall adjacent the fill openings 12, the terminals 13 and 14, and the data indicating means 15 free of dirt and foreign matter. Thus, not only does the cover structure provide for facilitated closing and opening of the fill openings, but further provides improved cover protective means for the battery preserving the cleanliness thereof and resultingly providing for improved maintenance.

The foregoing disclosure of specific embodiments is illustrative of the broad inventive concepts comprehended by the invention.

We claim:

1. In a storage battery having a top wall, fill openings in the top wall, and spaced terminals projecting upwardly from the top wall, a cover structure comprising: a panel having a preselected configuration suitable to overlie said openings and terminals; plug means depending from said panel for fitted engagement with said top wall in said fill openings providing a vented closure of said openings and retaining a deflector portion of said panel in superposed relationship to said battery top wall spaced above said battery terminals to protect said terminals from foreign matter falling downwardly thereon; and enclosing wall means depending from said panel about said plug means to extend to superjacent said battery top wall protectively laterally enclosing only said plug means, while permitting free access to said battery terminals from laterally subjacent said panel outwardly of said enclosing wall means, said deflector portion outwardly of said enclosing wall means defining a grasping portion for manual grasping thereof with the user's fingers extending between said grasping portion and said battery top wall.

2. The storage battery cover structure of claim 1 wherein said battery top wall is defined by front, side and rear edges and said panel is arranged to have side and rear edges thereof vertically aligned with said top wall side and rear edges and a front edges thereof spaced rearwardly of said battery top wall front edge.

3. The storage battery cover structure of claim 1 wherein said panel deflector portion defines a pair of spaces between said deflector portion and said battery top wall for facilitating removal of said cover from the battery.

4. The storage battery cover structure of claim 1 further including battery data indicating means, means for retaining the indicating means on the top wall, and wall means depending from said panel to superjacent said top wall about said data indicating means for protectively laterally enclosing the space above said data indicating means to protect said data indicating means against deposition of foreign matter thereon.

5. The storage battery cover structure of claim 4 wherein said data indicating means is disposed intermediate said spaced battery terminals.

6. The storage battery cover structure of claim 1 wherein said battery top wall is rectangular and said panel is rectangular extending substantially the full width of the battery.

7. The storage battery cover structure of claim 1 wherein said panel is provided with upwardly projecting ribs extending the width of said panel, and depending wall means extending perpendicularly to the width of the panel, said ribs and wall means reinforcing said panel against deflection perpendicular to the flat plane thereof.

8. In a storage battery having a top wall, fill openings in the top wall, and spaced terminals projecting upwardly from the top wall, a cover structure comprising: a panel having a preselected configuration suitable to overlie said openings and terminals; and plug means depending from said panel for fitted engagement with said top wall in said fill openings providing a vented closure of said openings and retaining said panel in superposed relationship to said top wall spaced above said battery terminals to protect said terminals from foreign matter falling downwardly thereon while permitting free access to said terminals from laterally subjacent said panel, said panel defining peripheral edges, and rear corners overlying said battery terminals and being provided with a depending wall means extending along the edges thereof spaced from said rear corners to permit free access to said battery terminals and protectively laterally enclosing only a portion of the space between said battery top wall and said panel.

9. The storage battery cover structure of claim 8 wherein said panel has a dimension perpendicular to the width thereof substantially less than the corresponding dimension of said battery top wall.

* * * * *